United States Patent
Gauthier, Jr. et al.

(10) Patent No.: US 12,092,518 B2
(45) Date of Patent: Sep. 17, 2024

(54) HIGH POWER LASER PROFILER

(71) Applicant: The Johns Hopkins University, Baltimore, MD (US)

(72) Inventors: Leo R. Gauthier, Jr., Ellicott City, MD (US); Kenneth W. Harclerode, Pasadena, MD (US)

(73) Assignee: The Johns Hopkins University, Baltimore, MD (US)

(*) Notice: Subject to any disclaimer, the term of this patent is extended or adjusted under 35 U.S.C. 154(b) by 413 days.

(21) Appl. No.: 17/676,119

(22) Filed: Feb. 19, 2022

(65) Prior Publication Data
US 2022/0333982 A1 Oct. 20, 2022

Related U.S. Application Data

(60) Provisional application No. 63/176,428, filed on Apr. 19, 2021.

(51) Int. Cl.
| | | |
|---|---|---|
| *G02B 21/06* | (2006.01) | |
| *G01J 1/42* | (2006.01) | |
| *H01S 3/00* | (2006.01) | |

(52) U.S. Cl.
CPC ............ *G01J 1/4257* (2013.01); *G02B 21/06* (2013.01); *H01S 3/0014* (2013.01); *G01J 2001/4261* (2013.01)

(58) Field of Classification Search
CPC ........ G01N 25/72; G01N 25/58; G02B 21/06; G01J 1/4257; G01J 2001/4261; H01S 3/0014
See application file for complete search history.

(56) References Cited

U.S. PATENT DOCUMENTS

| | | |
|---|---|---|
| 3,909,132 A | 9/1975 | Barrett |
| 4,306,150 A | 12/1981 | Dietz |
| 4,634,870 A | 1/1987 | Metcalf |
| 4,747,698 A | 5/1988 | Wickramasinghe et al. |
| 4,985,858 A | 1/1991 | Morrison, Jr. et al. |

(Continued)

FOREIGN PATENT DOCUMENTS

| | | |
|---|---|---|
| GB | 2207236 A | 1/1989 |
| JP | S61186826 A | 8/1986 |

(Continued)

OTHER PUBLICATIONS

Jed A. Simmons et al., "Development of a non-contact diagnostic tool for high power lasers," Proceedings of the SPIE, vol. 9741, id. 97410N, 2016, pp. 1-7.

(Continued)

*Primary Examiner* — Abdullahi Nur
(74) *Attorney, Agent, or Firm* — Noah J. Hayward (57) ABSTRACT

Provided herein are a system and a method thereof which allows for calibrating a laser or getting characteristics of the laser by measuring the temporally and spatially resolved beam profile and power density cross-section using non-contact radiometry. An example method includes receiving a radiation beam from a light source by protrusions that protrude from a plate. The example method further includes imaging the protrusions, measuring a respective temperature of each of the protrusions based on the imaging, and profiling the radiation beam based on the measuring.

18 Claims, 7 Drawing Sheets

(56) References Cited

U.S. PATENT DOCUMENTS

| | | | |
|---|---|---|---|
| 5,072,120 | A | 12/1991 | Siewick |
| 5,102,231 | A | 4/1992 | Loewenstein et al. |
| 5,365,065 | A | 11/1994 | Power |
| 5,513,006 | A | 4/1996 | Schulz et al. |
| 5,836,694 | A | 11/1998 | Nguyen |
| 5,995,223 | A | 11/1999 | Power |
| 6,756,591 | B1 | 6/2004 | Lounis et al. |
| 6,850,329 | B2 | 2/2005 | Tobiason et al. |
| 7,018,094 | B1 | 3/2006 | Bates |
| 7,491,922 | B1 * | 2/2009 | Deliwala ............... G02B 23/12 250/330 |
| 7,767,951 | B1 | 8/2010 | Deliwala et al. |
| 9,377,424 | B2 * | 6/2016 | Myrick ............... G01N 25/72 |
| 2005/0190439 | A1 | 9/2005 | Kitamori et al. |
| 2007/0115475 | A1 | 5/2007 | Shpantzer |
| 2008/0218850 | A1 | 9/2008 | Power |
| 2011/0186128 | A1 * | 8/2011 | Shih ..................... H02S 50/00 136/259 |
| 2012/0053891 | A1 * | 3/2012 | Abbott, III ........... G01B 5/0004 702/173 |
| 2017/0067839 | A1 | 3/2017 | Caulier et al. |
| 2017/0138787 | A1 * | 5/2017 | Maeda ................ G01J 1/0252 |
| 2017/0343418 | A1 * | 11/2017 | Hurbi ..................... G01J 5/10 |
| 2018/0254265 | A1 * | 9/2018 | Seif ..................... H01L 33/08 |

FOREIGN PATENT DOCUMENTS

| | | |
|---|---|---|
| SU | 789691 A1 | 12/1980 |
| WO | 2002054046 A1 | 7/2002 |
| WO | 2006114490 A2 | 11/2006 |
| WO | 2020088737 A1 | 5/2020 |

OTHER PUBLICATIONS

K. L. Saenger, "An interferometric calorimeter for thin-film thermal diffusivity measurements," Journal of Applied Physics, 65(4), https://doi.org/10.1063/1.342957, 1989, pp. 1447-1452.

* cited by examiner

HIGH POWER LASER PROFILER

CROSS-REFERENCE TO RELATED APPLICATIONS

This application claims priority to and the benefit of prior-filed, U.S. Provisional Application No. 63/176,428, filed Apr. 19, 2021, the content of which is incorporated by reference herein in its entirety.

STATEMENT OF GOVERNMENT INTEREST

This invention was made with government support under contract number HQ0147-18-D-0004 awarded by the Missile Defense Agency (MDA). The Government has certain rights in the invention.

TECHNICAL FIELD

This disclosure relates generally to testing hardware using a high profile laser that projects thermal beam profiles upon test hardware.

BACKGROUND

The demand for effective high power laser measurement tools has increased over time. High power lasers are often used to project thermal beam profiles on test hardware. It is desirable to have a smooth and known distribution of energy on the test hardware during testing to prevent local hot spots from introducing test artifacts. The characteristics of a laser beam are determined by the hardware that produces the beam and the optics between the laser beam and a target. However, existing techniques for measuring these characteristics are lacking in resolution and accuracy.

BRIEF SUMMARY

Provided herein are system, apparatus, article of manufacture, method and/or computer program product embodiments, and/or combinations and sub-combinations thereof which allow for calibrating a laser or getting characteristics of the laser by measuring the temporally and spatially resolved beam profile and power density cross-section using non-contact radiometry.

At least some of the embodiments are directed to a system that includes a plate having protrusions, the protrusions being configured to receive a radiation beam emitted by a light source. The system further includes a first detector having a radiance imaging device. The first detector is configured to measure a respective temperature of each of the protrusions.

At least some of the embodiments are directed to a method. The method includes receiving a radiation beam from a light source by protrusions that protrude from a plate, imaging the protrusions, measuring a respective temperature of each of the protrusions based on the imaging, and profiling the radiation beam based on the measuring.

At least some of the embodiments are directed to an apparatus including a plate including protrusions. The protrusions are configured to receive a radiation beam that causes temperature changes within the protrusions. The protrusions have a predetermined diameter and are spaced apart such that heat travels along a respective length of each of the protrusions without affecting heat in another one of the protrusions. The apparatus also includes a coating on at least a light receiving end of each of the protrusions, and the coating affects higher emissivity.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Power and power density are among the most important characteristics of laser beams to be measured and controlled for essentially all laser applications. The power density in this context is a point function across the cross-section of the beam at the surface of intersection with the hardware under test. The beam shape that is incident on the hardware can have any shape, circular, rectangular, or other, as determined by the beam optics and apertures that are used to realize the beam. There are many methods to measure the overall beam power using calorimeters but these do not provide any insight into how the beam energy is distributed across the beam cross-section. The more difficult characterization is the measurement of the power density profile of high power laser beams as it requires multiple measurements of the power density at a grid of points within the beam cross-section.

Present technology suffers from a majority of drawbacks. Lateral conductive heat flow paths in standard diagnostics test articles cause localized hot spots or transients to quickly decay to appear as the average equilibrium conditions. A lack of lateral conductive heat flow paths is therefore desirable.

A grid of thermocouples and heat flux sensors can also be used to measure the laser beam profile. However, with a larger beam, the number of required thermocouples become unmanageable and the afforded conduction paths from the wires alter the observed heating beam profiles. When using heat flux gauges, the gauges must often employ additional cooling measures since they may be damaged by the high material temperatures. The gauges are areal sensors and will not provide the high spatial resolution of the incident beam that is desired.

Additionally, some test fixtures emit noxious gases upon the application of the laser heating beam profiles. Other materials are desirable in order to not emit harmful gases.

Present devices and methods for measurement of beam profile is not satisfactory. A new method is proposed based on non-contact radiometry.

Provided herein are system, apparatus, article of manufacture, method and/or computer program product embodiments, and/or combinations and sub-combinations thereof which allow for calibrating a laser or getting characteristics of the laser using the below described process.

Accordingly, a system for measuring a laser beam profile and power density of the beam is described. The power density and energy profile of the laser beam may both be calculated and measured, according to some embodiments.

A method for projecting thermal beam profiles using a high power laser is presented. It is desirable to have a smooth and known distribution of energy on test hardware. It is further desirable to prevent localized hot spots, which can introduce test artifacts. Characteristics of the beam are determined by hardware that produces the beam and the optics between the beam and a target. A plate with a plurality of pins is proposed. This bed of nails geometry can eliminate the lateral conductive paths for the heat flow. A camera can image the proposed fixture while it is exposed to the laser beam to produce a spatially and temporally resolved record of the 2D profile of the incident beam.

The energy distributed over the space that the incident beam impinges on is calculated as well as the power density.

A precise measurement of the laser beam profile is required for energy balance. Typically when measuring the laser beam profile, the power density changes across the beam. Furthermore, by measuring the temperature and heat of the beam, the profile of the beam may be calculated. Often, the goal is to measure the normal energy distribution and that no hot spots exist. A homogenous beam profile is desired.

Additionally, by measuring the beam profile of a laser, the beam profile may be used to provide concentrated heating effects of the laser on any testing system that may or may not want heating effects.

A laser beam impinges on a plate that includes pins or rods. The pins may act as a calorimeter. The laser may be a carbon dioxide ($CO_2$) laser. The radiation of the laser is long wave at 10.6 microns.

As described earlier, a heat flux sensor is not an ideal solution due to the large number of pins being used, which would require use of too many cables. Instead, a radiance imaging device is proposed.

The radiance imaging device, such as a long wave infrared imaging (LWIR) camera may be used to measure the temperature at the tips of the pins. The LWIR camera is able to image objects, such as pins or rods, using their own light and discriminate between those objects based on their temperature. Further to that effect, the LWIR camera has high spatial resolution to differentiate between the pins. The LWIR camera can measure the temperature of the pins from the front side of the pins and also from the backside. The pins may be treated as their own measurement system.

The camera may take multiple pictures so that the measurement of the power density is continuous and may be done frame by frame. The camera is looking at the heat of the pins, not imaging the laser beam. Additionally, the camera should be kept at room temperature.

By using a standard radiometric LWIR camera with the plurality of pins, wires are not required to be attached. The heating profiles delivered by the laser beam are not affected by the instrument that collects the data and the fine spatial and temporal resolution are preserved.

A mid-wave infrared camera may also be used. As described, the temperature of the pins are relevant and this can also be determined from a mid-wave infrared camera. LWIR cameras are used for temperature measurements since they are typically less expensive than mid-wave cameras.

The heat conduction differential equation may be used to calculate the heat energy absorbed by each pin during laser heating from the knowledge of the initial temperature throughout the pins the measured temperatures at both ends of the pins during lasing. The differential equation is used to compute the internal thermal energy of the pins as the heat propagates through the pins. The net increases of the internal thermal energies of the pins are computed during each time step. These net increases of pin energy are used to compute the power delivered by the laser to each pin during each time step because they must be equal by the law of the conservation of energy. Thus the power delivered to each pin by the laser beam may be calculated using the energy balance.

The power density incident on each pin may then be calculated using the known cross-sectional area of each pin tip.

A variety of materials were used for testing purposes. For example, the laser impinging upon an acrylic block was used. The beam is projected on the acrylic block and the beam profile is imprinted onto the melted surface of the block. However, the acrylic block gave a good indication of the beam profile, but was not quantitative. Specifically, average beam parameters can be captured, but transient events or sharp gradients in the beam profile are not recorded. Unfortunately, the transient events and sharp gradients are smoothed out by the lateral heat transfer.

Additionally, plastic cannot be used as the laser melts the plastic and the beam profile cannot be calculated. An actual quantitative approach is possible by using a plate with a plurality of pins.

The plate includes a plurality of pins is proposed. The plate is roughly 0.25 inches in thickness. The number of pins should be great enough to cover the expected area of laser illumination with the desired spatial resolution of the measurements. A design of a bed of nails on a plate causes an absence of lateral conductive heat pathways. This prevents sharp spatial and temporal gradients from quickly establishing equilibrium, which preserves the record of the heating profiles in the recorded LWIR camera data.

The pins may include a homogenous material, such as stainless steel. Homogenous materials with known heat capacity and thermal conductivity properties is desirable. For example, stainless steel is useful material as it can withstand high heating rates. Stainless steel such as 4307 steel may be used. The pins are treated with a surface treatment for higher uniform emissivity on the pin tips, the part of the pin that the laser is incident upon. Painting the pins with a high temperature flat black paint, for example, has a darkening effect. Having a high, uniform emissivity at the same wavelength that the laser emits allows for incident energy to be absorbed. Additionally, the pins should have a high melting point.

The pin material of stainless steel is also selected as stainless steel can withstand a rise in temperature caused by the laser power density flux for a long period of time. Black oxide stainless steel rods may also be used. Additionally, the pins should not be mirror surfaces, as a mirror surface will reflect radiant heat. Instead, a lambertian tip is desired since lambertian reflection is a diffusely reflecting surface provides a better signal for the radiance imaging device from different perspective angles.

The pins are all at the same height and have a diameter such that the camera is able to resolve a minimum of approximately 4 to 5 pixels across a pin tip and, further, have a diameter that is no larger than necessary. More particularly, the diameter of the pins should be in a range from approximately 0.050 inches to approximately 0.250 inches. Even more specifically, the pins in one embodiment have a diameter of approximately 0.086 inches and, in another embodiment, approximately 0.094 inches. The spacing between the pins should also be considered as the highest resolution possible from the pins. The pins should be close together, but still far enough apart for the LWIR camera to still distinguish between the plurality of pins. Additionally, the radiation heat transfer and lateral heat flow between the pins should be minimized.

Since air is between the pins and air has low thermal conductivity as compared to steel, very little lateral heat conduction occurs through the air between the adjacent pins. The bulk of the heat conduction has to travel down the pins towards the cooler plate. If paper or acrylic or another solid material are between the rods, then they will provide other conductive pathways for lateral heat transfer and the beam profile will be measured inaccurately. The space between the pins keep the heat from conducting laterally from pin to pin. In addition, the radiative transfer of heat between pins is kept to a minimum because the temperatures of adjacent pins are nearly equal. Furthermore convective heat transfer between pins is minimized by using test fixture materials with high heat capacity, like steel, to minimize the convective air heating between the pins.

The bed of nails geometry as described is high and uniform in emissivity to facilitate measurements with the LWIR camera.

Figure 1:
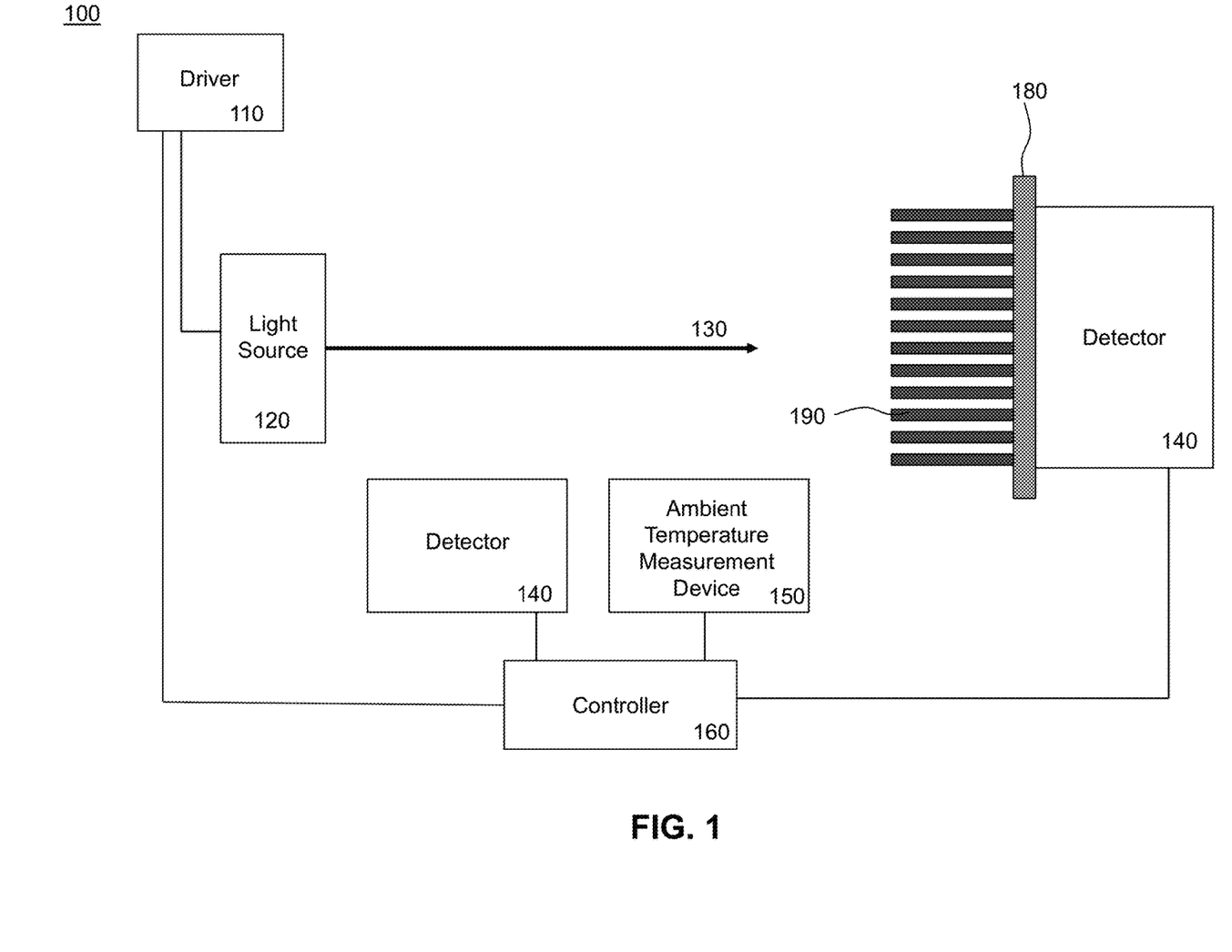
FIG. 1 illustrates a system for projecting thermal laser beam profiles according to an example embodiment.

FIG. 1 illustrates a system 100 for projecting thermal laser beam profiles, according to some embodiments. A light source 120, such as a laser, emits a beam 130. The beam 130 is incident on a plate 180 with a plurality of protrusions, e.g., pins, 190. Two detectors 140 are present such that they can measure the temperature of the pins 190.

A driver 110 is connected to both the light source 120 and a controller 160. The controller 160 is connected to both detectors 140 and additionally connected to an ambient temperature measurement device 150. The ambient temperature measurement device 150 measures the ambient temperature before the light source 120 emits the beam 130.

Once the test fixture, defined as the assembly comprising the plate 180 and the pins 190, reaches thermal equilibrium, the ambient temperature is taken. This ambient temperature is used in conjunction with the heat equation that is calculated for each pin 190. The ambient temperature is the first temperature used to calculate the beam profile and each incremental temperature from the camera is used thereafter. By using two detectors 140 in the system, the two detectors 140 help to increase the accuracy of measuring the temperature of the pins 190.

Figure 2:
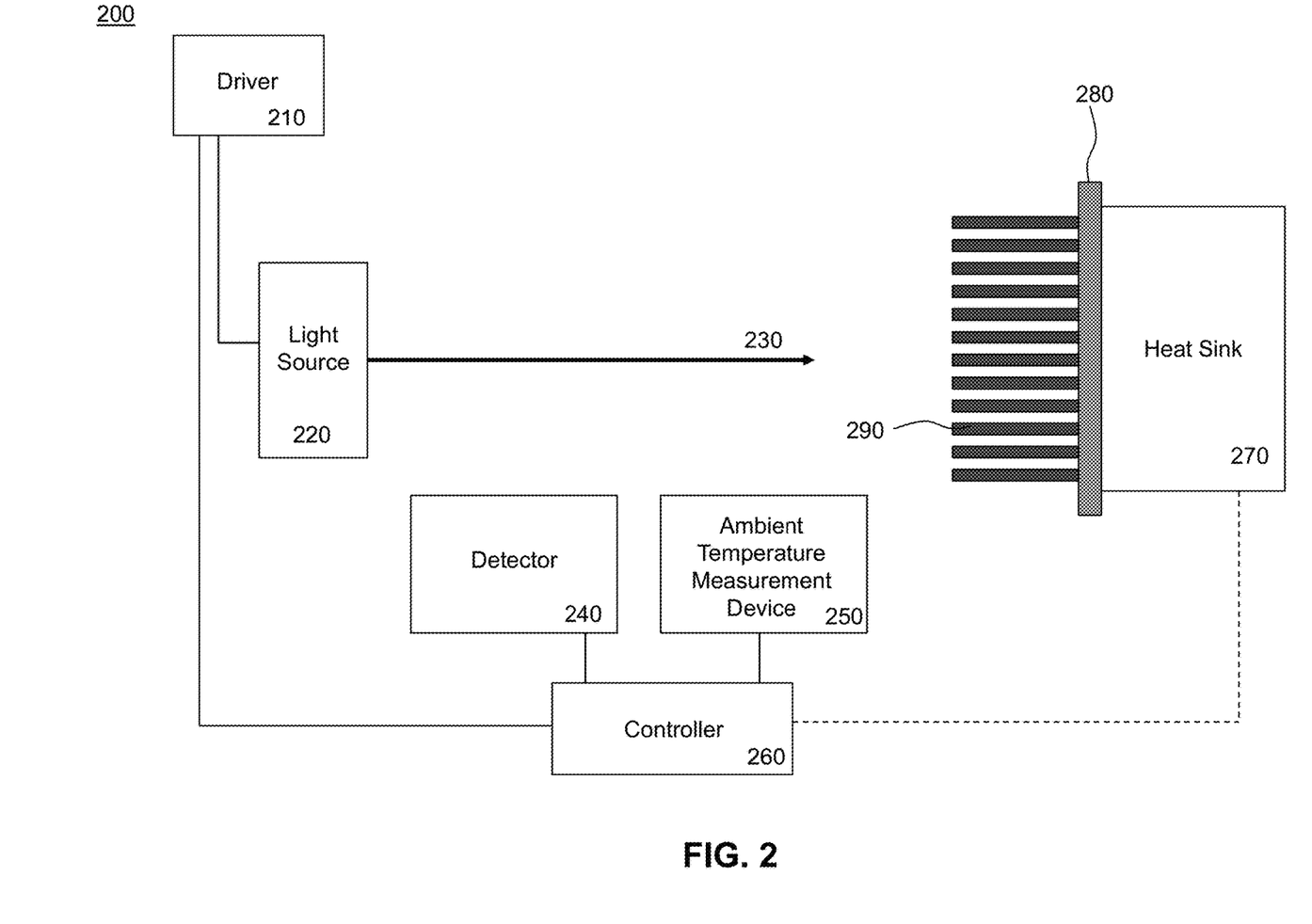
FIG. 2 illustrates another system for projecting thermal laser beam profiles, according to some embodiments.

FIG. 2 illustrates another system 200 for projecting thermal laser beam profiles, according to some embodiments. System 200 is similar to system, but instead uses only one detector 240 and additionally one heat sink 270. The heat sink 270 is thermally coupled to the back side of plate 280. Plate 280 includes a plurality of pins 290.

The energy balance on each pin can still be calculated using one detector 240 and the heat sink 270. The temperature of the heat sink 270 is known so the temperature of the pins on the front side are measured using the detector 240. The heat sink is made from a high temperature material, such as stainless steel, similar to the pins.

Similarly to the system 100 of FIG. 1, the system 200 has a light source 220 that emits a beam 230. The controller 260 is connected to a driver 210, the detector 240, an ambient temperature measurement device 250, and the heat sink 270. The driver 210 is additionally connected to the light source 220.

Since the pins 190, 290 of are made of a known material with high conductivity, such as stainless steel, the temperature at both ends of the pins is known.

Figure 3:
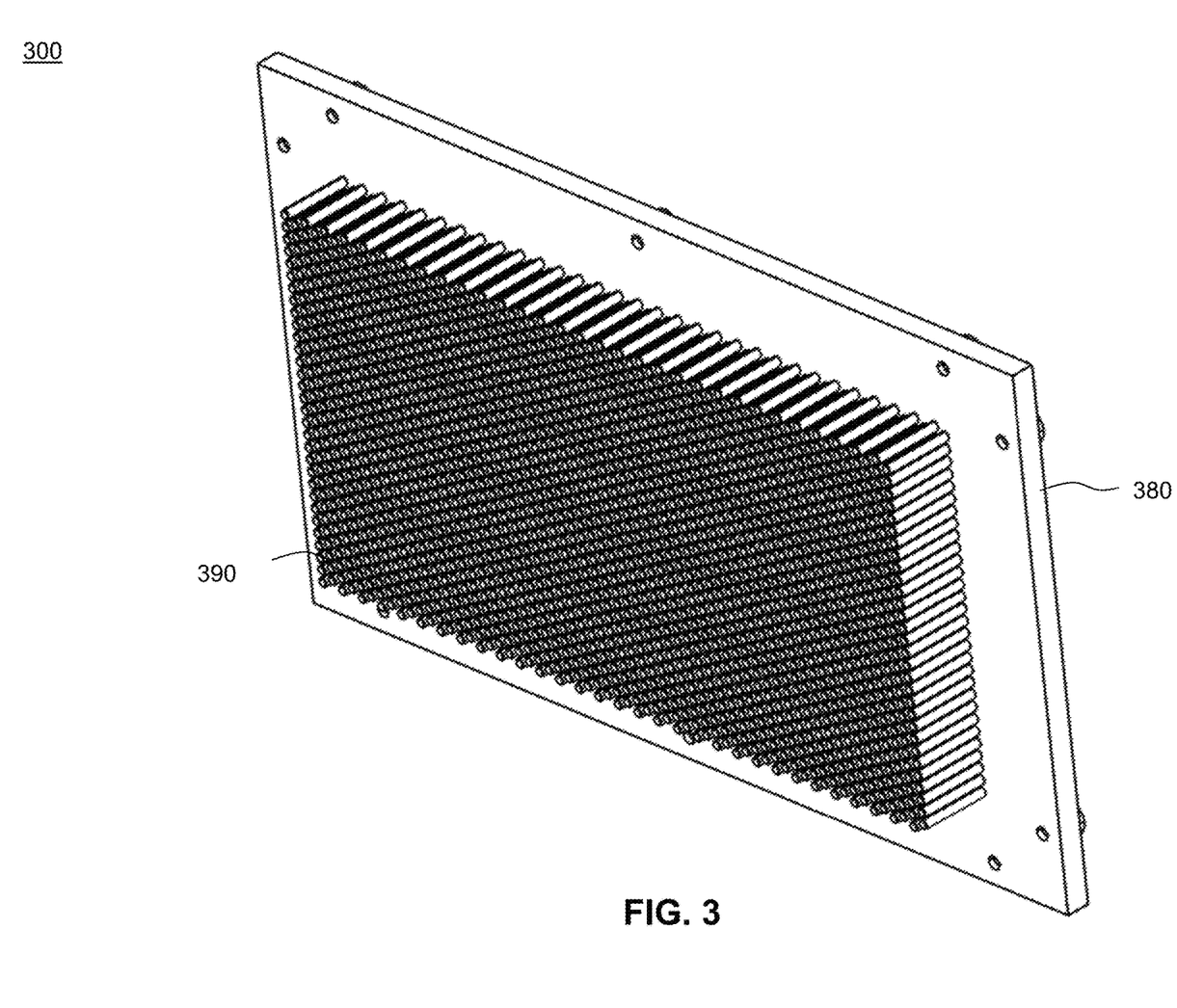
FIG. 3 depicts an alternate view of a plate with protrusions extending therefrom, according to some embodiments.

FIG. 3 depicts an alternate view 300 of a plate 380 with protrusions extending from thereof, according to some embodiments. The plate 380 is positioned in front of an incident beam. A plurality of protrusions 390, pins or rods, extend from the plate 380.

Figure 4:
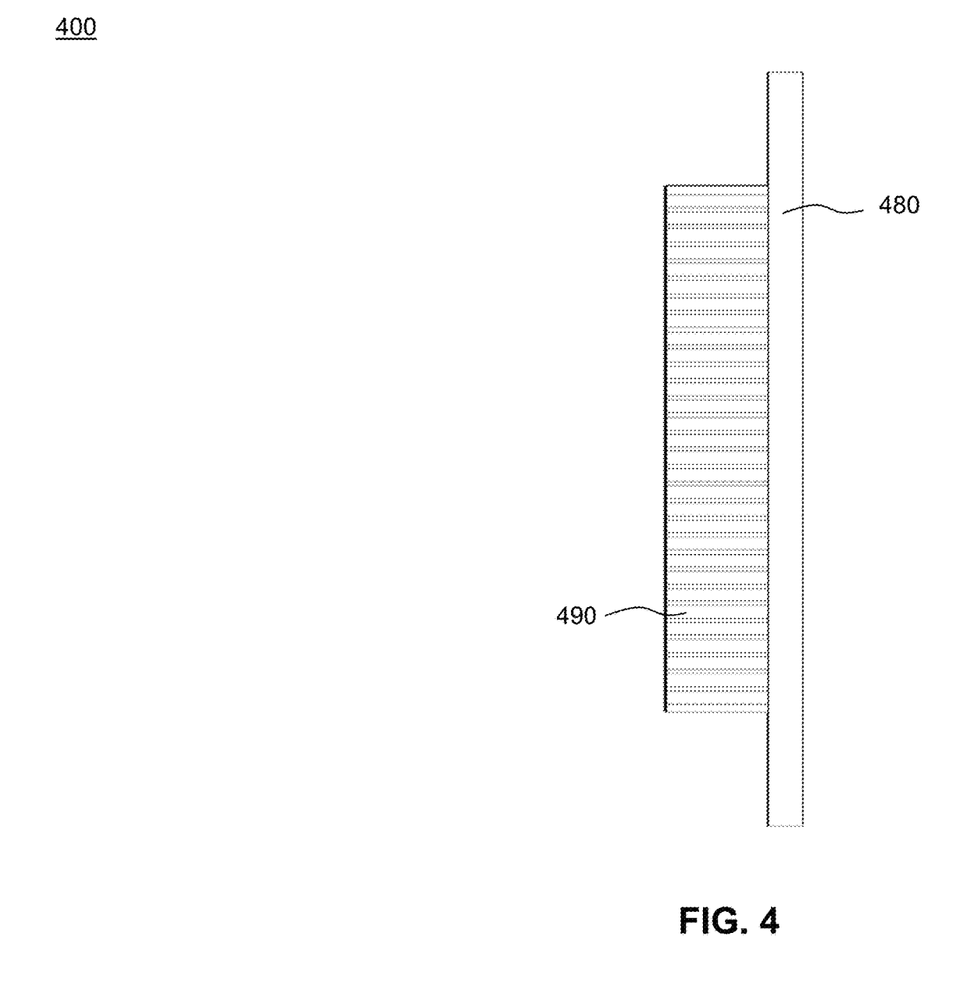
FIG. 4 depicts a side view of a plate with protrusions extending therefrom, according to some embodiments.

FIG. 4 depicts a side view 400 of a plate with protrusions extending from thereof, according to some embodiments. The plate 480 is positioned in front of an incident beam. A plurality of protrusions 490, pins or rods, extend from the plate 480.

Figure 5:
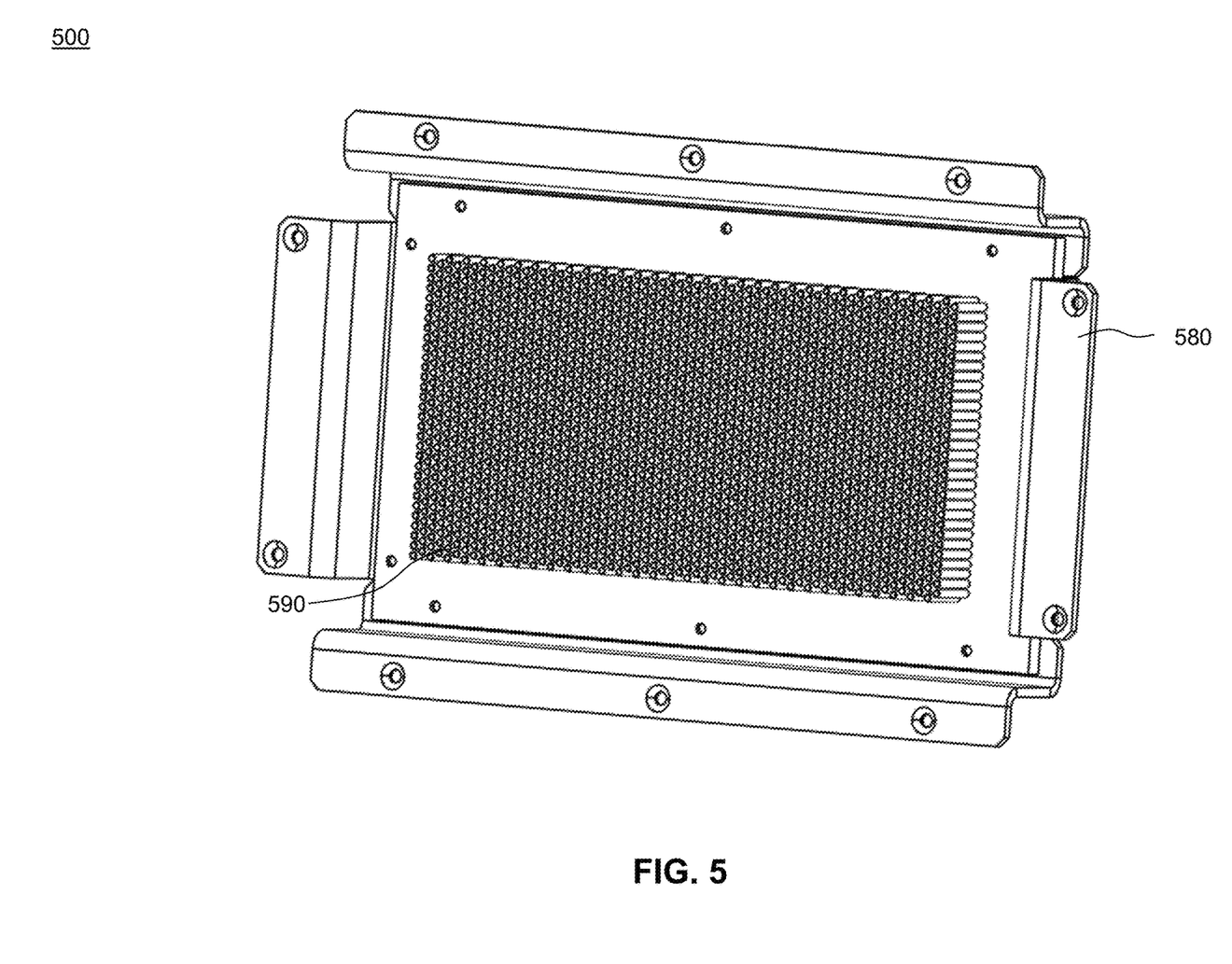
FIG. 5 depicts yet another alternate view of a plate with protrusions extending therefrom, according to some embodiments.

FIG. 5 depicts yet another alternate view 500 of a plate with protrusions extending from thereof, according to some embodiments. The plate 580 is positioned in front of an incident beam. A plurality of protrusions 590, pins or rods, extend from the plate 580.

Figure 6:
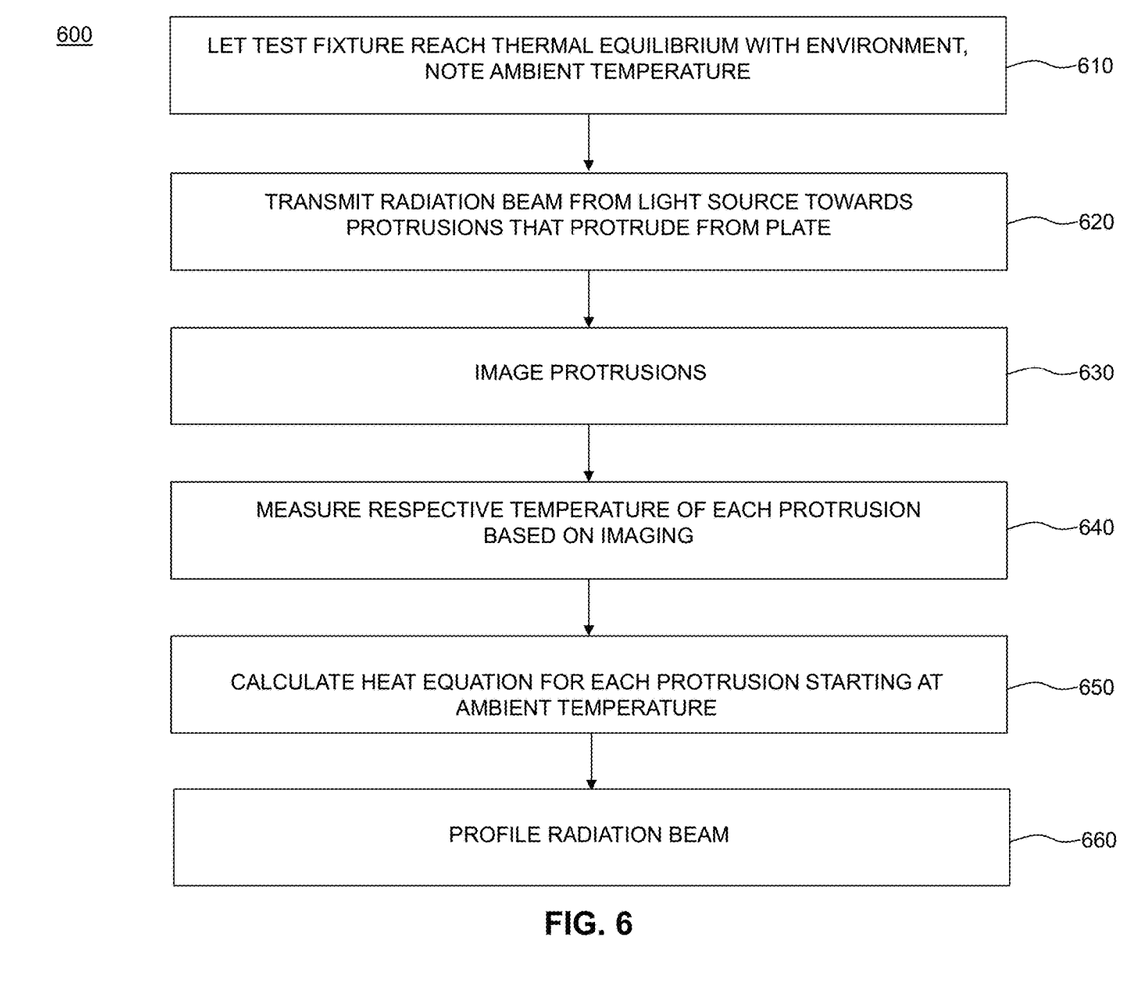
FIG. 6 describes a flowchart showing a method of projecting thermal laser beam profiles, according to some embodiments.

FIG. 6 describes a flowchart showing a method of projecting thermal laser beam profiles, according to some embodiments.

In step 610, the test fixture, which includes the plate and pins, reaches thermal equilibrium within the environment. The ambient temperature should be noted.

In step 620, a radiation beam is transmitted from a light source. The light source transmits in the direction of a plate that includes a plurality of pins.

In step 630, the protrusions (e.g., pins) are imaged.

In step 640, the respective temperature of each protrusion/pin may be measured based on the imaging from step 630.

In step 650, the heat equation is calculated for each protrusion/pin starting at ambient temperature.

In step 660, the radiation beam is profiled based on the measuring 640 and/or the calculating/650.

Data was collected and compared to simulations. An algorithm was developed to obtain the energy profile and the power density can be calculated using differential equations. The software allows for calculating incremental power density and then adding the increments together to find the total.

Figure 7:
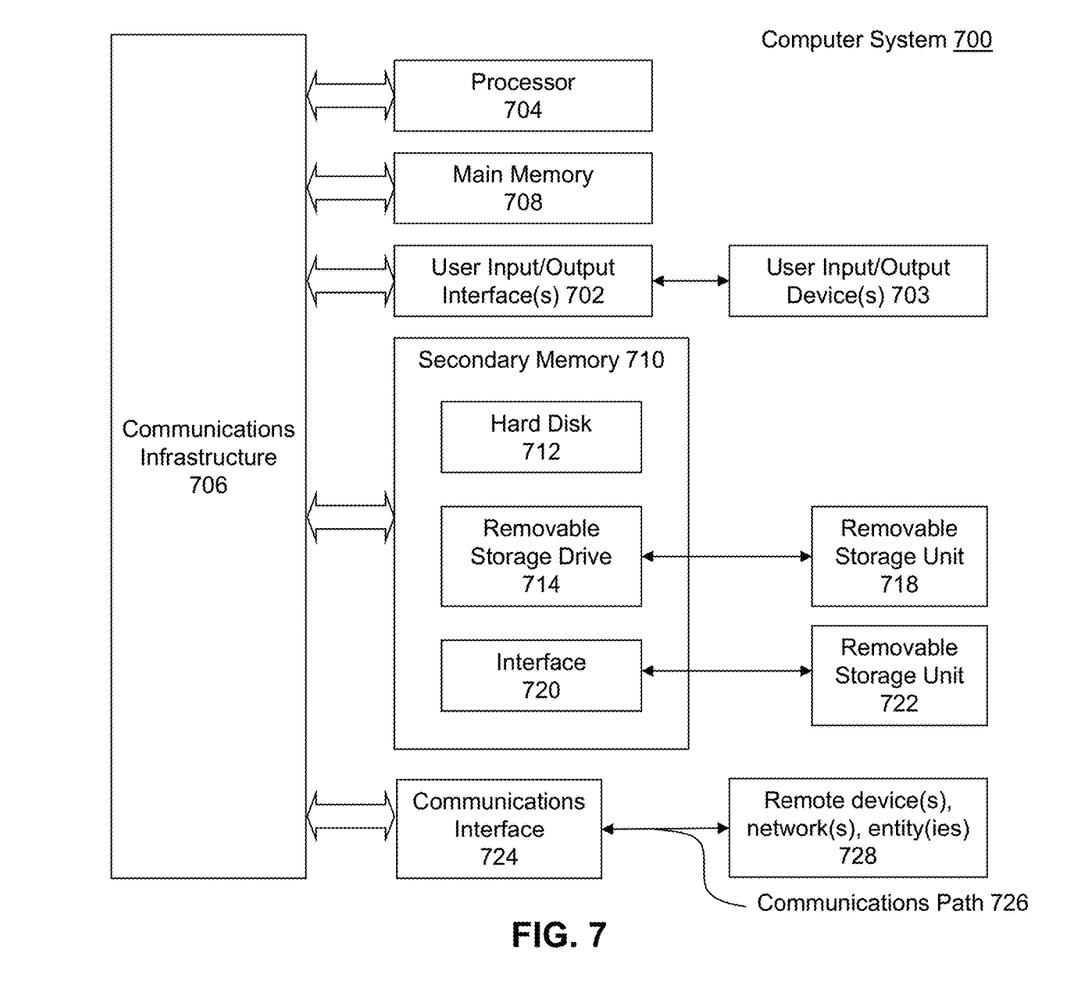
FIG. 7 illustrates a block diagram of a computer that may be used to perform various aspects of the present disclosure, according to some embodiments.

Various embodiments may be implemented, for example, using one or more computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure (or bus) 706.

Computer system 700 may also include user input/output device(s) 702, such as monitors, keyboards, pointing devices, etc., which may communicate with communication infrastructure/bus 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random-access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein. For example, the instructions, when executed by one or more processors, cause the processors to perform a method for managing third party applications on a computing apparatus as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system embodiments other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
a plate comprising protrusions, wherein the protrusions are configured to receive a radiation beam emitted by a light source and have a predetermined diameter and are spaced apart such that heat travels along a respective length of each of the protrusions without affecting heat in another one of the protrusions; and
a first detector comprising a radiance imaging device, wherein the first detector is configured to measure a respective temperature of each of the protrusions.

2. The system of claim 1, further comprising a heat sink coupled to the plate.

3. The system of claim 1, further comprising a coating on at least a light receiving end of each of the protrusions, wherein the coating affects higher emissivity.

4. The system of claim 1, wherein the protrusions comprise a homogenous material.

5. The system of claim 1, further comprising a controller, wherein the controller determines a cross power density of the radiation beam based on measured respective temperatures of each of the protrusions.

6. The system of claim 1, further comprising a second detector, wherein the first detector is configured to measure the respective temperature of each of the protrusions at a light receiving end at a respective distance from each of the protrusions, and
the second detector is configured to measure temperature on a backside of the plate.

7. The system of claim 1, further comprising a computer system, wherein the computer system determines a cross power density of the radiation beam based on measured respective temperatures of each of the protrusions.

8. A method comprising:
receiving a radiation beam from a light source by protrusions that protrude from a plate;
imaging the protrusions;
measuring a respective temperature of each of the protrusions based on the imaging; and
profiling the radiation beam based on the measuring, wherein
the protrusions are spaced apart such that heat travels along a respective length of each of the protrusions without effecting other ones of the protrusions.

9. The method of claim 8, wherein the imaging comprises imaging the protrusions using a radiance imaging device.

10. The method of claim 8, wherein a heat sink is coupled to the plate.

11. The method of claim 8, wherein a respective surface of each of the protrusions is coated for higher emissivity.

12. The method of claim 8, wherein the protrusions comprise a homogenous material.

13. The method of claim 8, wherein the profiling comprises determining a power density cross section of the radiation beam based on the measured respective temperature of each of the protrusions.

14. An apparatus comprising:
a plate comprising protrusions, wherein
the protrusions are configured to receive a radiation beam that causes temperature changes within the protrusions, and
wherein the protrusions have a predetermined diameter and are spaced apart such that heat travels along a respective length of each of the protrusions without affecting heat in another one of the protrusions; and
a coating on at least a light receiving end of each of the protrusions, wherein the coating affects higher emissivity.

15. The apparatus of claim 14, further comprising a detector configured to measure a respective temperature of each of the protrusions.

16. The apparatus of claim 15, wherein the detector comprises a radiance imaging device.

17. The apparatus of claim 14, further comprising a heat sink coupled to the plate.

18. The apparatus of claim 14, wherein the protrusions comprise a homogenous material.

* * * * *